United States Patent
Lee et al.

(10) Patent No.: US 11,269,413 B2
(45) Date of Patent: Mar. 8, 2022

(54) BRAIN-COMPUTER INTERFACE SYSTEM AND METHOD FOR DECODING USER'S CONVERSATION INTENTION USING THE SAME

(71) Applicant: Korea University Research and Business Foundation, Seoul (KR)

(72) Inventors: Seong-Whan Lee, Seoul (KR); Ji-Hoon Jeong, Seoul (KR); No-Sang Kwak, Seoul (KR); Seo-Hyun Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 314 days.

(21) Appl. No.: 16/676,617

(22) Filed: Nov. 7, 2019

(65) Prior Publication Data

US 2020/0142481 A1    May 7, 2020

(30) Foreign Application Priority Data

Nov. 7, 2018   (KR) .................. 10-2018-0135585
Apr. 17, 2019  (KR) .................. 10-2019-0044793

(51) Int. Cl.
*G06F 3/01*    (2006.01)
*G06F 40/40*   (2020.01)

(52) U.S. Cl.
CPC .............. *G06F 3/015* (2013.01); *G06F 40/40* (2020.01)

(58) Field of Classification Search
CPC .......... G06F 3/015; G06F 40/40; G06F 40/56; G06F 40/30; G06N 3/0454; G06N 3/088; G06N 7/005; G06N 20/00
USPC ........................................................ 704/270
See application file for complete search history.

(56) References Cited

FOREIGN PATENT DOCUMENTS

| KR | 10-0913753 B1 | 8/2009 |
|---|---|---|
| KR | 10-1416616 B1 | 7/2014 |
| KR | 10-1518575 B1 | 5/2015 |
| KR | 10-1553256 B1 | 9/2015 |
| KR | 10-1633743 B1 | 7/2016 |
| KR | 10-1724939 B1 | 4/2017 |
| KR | 10-1768106 B1 | 8/2017 |

*Primary Examiner* — Thierry L Pham
(74) *Attorney, Agent, or Firm* — NSIP Law

(57) ABSTRACT

The present invention relates to a brain-computer interface system and a method for recognizing a conversation intention of a user using the same in addition to inferring the waveform of word sound intended by a user from an imagined speech brainwave associated with a word intended by a user, since the user can intuitively recognize the sentence he/she wants to speak through the imagined speech by classifying words that are most relevant to the imagined speech brainwave of the user in a database in which a word often used by the user or frequently used in a specific situation is stored and by generating a sentence intended by the user by recognizing the words classified in this way, it is possible to perform communication by only thoughts of the user.

16 Claims, 3 Drawing Sheets

BRAIN-COMPUTER INTERFACE SYSTEM AND METHOD FOR DECODING USER'S CONVERSATION INTENTION USING THE SAME

CROSS REFERENCE

This application claims the benefit under 35 USC 119(a) of Korean Patent Application No. 10-2018-0135585 filed on Nov. 7, 2018 and Korean Patent Application No. 10-2019-0044793 filed on Apr. 17, 2019 in the Korean Intellectual Property Office, the entire disclosures of which are incorporated herein by reference for all purposes.

TECHNICAL FIELD

The present invention relates to a brain-computer interface system and a method for recognizing a conversation intention of a user using the same for providing a sentence intended by a user in a form of voice or text based on an imagined speech brainwave including the conversational intention of a user.

BACKGROUND ART

A brainwave is an electrical signal that is expressed when information is transmitted between a body's nervous system and brain nerves, can be measured through an electrode attached to the scalp without a surgical operation by non-invasive method, and can be an important tool for understanding an intention of a user by measuring the real-time activity of the brain.

In general, the brainwave is known to be classified into various types according to band-specific characteristics and temporal characteristics, and the alpha waves (frequency 8 Hz to 13 Hz, amplitude 20 V to 60V) that are expressed in a relaxed state with eyes closed, the beta waves (frequency 14 Hz to 30 Hz, amplitude 2 V to 20 V) that are expressed in a consciously focused state, and the theta waves (frequency 4 Hz to 7 Hz, amplitude 20 V to 100 V) that are expressed in a shallow sleep state, and the like are known.

A non-invasive brain-computer interface system is a technology in which an external device is controlled by recognizing an intention of a user through the brainwave measured from the scalp. It is mainly used in medical fields such as prosthetic control for patients who are not free or paralyzed due to spinal injury or neurodegenerative diseases, spellers for communication, and the like. Recently, however, the non-invasive brain-computer interface system is applied in various fields such as the development of assistance services in everyday life for the general public due to the development of a brainwave analysis technology.

In particular, a brain-computer interface technology based on the imagined speech is highly utilized because the intention of a user can be recognized without any external stimulus. The brain-computer interface technology based on the imagined speech is a technology of recognizing the intention of a user by using the brainwave generated when performing imagination such as making a sound or speaking without moving the articulation organ.

The imagined speech activates the Broca's area, the Wernicke's area, and the premotor cortex of the brain. It is known that the brainwave when imagining different words form different patterns. By using this pattern, it is possible to grasp the intention of a user according to various imagined speeches.

Currently, a communication method based on a brain-computer interface has a rather unintuitive aspect by using features that are not related to the elements of communication such as the movement imagination of a specific part.

Korean Patent Registration No. 10-1633743 relates to an apparatus and a system for controlling a device based on brainwave, and proposes the apparatus for controlling the device based on the brainwave of providing a service to a user by generating a reference brainwave pattern or a brainwave pattern for execution based on the brainwave detected from the user. However, the apparatus for controlling the device based on brainwave has a limitation in that it can control only the execution and non-execution of the function requested by the user using the brainwave, and it cannot express specificity that a specific intention of a user is recognized and then it is conveyed and reflected.

Korea Patent Registration No. 10-1553256 is a method for improving the reliability for an output value of a BCI system, and a method for confirming whether or not the output value is used by determining the suitability of the BCI system according to whether or not the brainwave of a user is generated and measuring the reliability of the output value. The above-described technology is only a method of determining whether or not to use or not by determining the reliability of the detected brainwave, and it has a limitation that it cannot propose how to improve the reliability or how to identify the exact intention of a user.

Korea Patent Registration No. 10-1518575 is a method of analyzing intention recognition of a user to convert brainwave data into a frequency signal and analyze motion imagination of a user according to a band of the converted frequency signal. The above-described technology has a limitation in that it does not take into account the characteristics of the motion imagination brainwaves coming from various frequency bands, and it is different from a technology using the imagined speech because it uses the motion imagination as a medium for the intention recognition.

Korea Patent Registration No. 10-0913753 relates to a word recognition system and a word recognition method using brainwave, and is to recognize a word intended by a user through the brainwave when imagining a series of characters constituting a word. The above-described technology is a system for inputting the characters imagined by the user among 26 alphabetic characters, and since each spelling constituting the word must be individually classified and inputted, there is a problem that it takes a long time to input a word.

Korea Patent Registration No. 10-1724939 proposes a system for analyzing and classifying patterns of brainwave based on brainwave information of a user measured while the user stares at a word provided on a screen. The above-described technology is a technology that performs classification using the brainwave that appears when words are seen through visual stimulus, not when imagined speech, and there is a limitation that it cannot be applied to a brain-computer interface technology that uses auditory stimulus, and it does not reflect elements that input words by only imagination without external stimulus.

Korea Patent Registration No. 10-1768106 proposes a speller system that detects and inputs a target character that a user is gazing among a plurality of characters by analyzing brainwave of the user through visual stimulus that causes a specific brain signal. The above-described technology has a limitation of being able to cause the user to feel tired by using visual stimulus causing brain signals and relying on external stimulus, and has problems in that the intuitive features of an intention recognition system do not appear because the desired spelling must be selected one by one in a character array.

Korea Patent Registration No. 10-1416616 proposes a system that detects a character that a user wants to input from a matrix in which different characters are arranged by using brainwave and eye movement as a word speller based on multiple bio signals. The above-described technology is a system capable of inputting of spelling only when an external stimulus is given, and since it uses not only the brainwave but also the eye movement, there is a limit in recognizing an intention of a user only by thinking. In addition, the above-described technology has a limitation in that it requires a long time because it requires input of a character unit and does not have an intuitive characteristic that reflects what the user thinks.

As described above, since the conventional brain-computer interface system recognizes intention of a user through the use of motion imagination or classification of brainwave generated by external stimulus, it can be seen that several limitations is present in constructing an intuitive brain-computer interface system. In addition, since the conventional word or letter recognition system using the brainwave cannot accurately convey the intention of a user in terms of efficiency and degree of freedom, has limitations that depend on the external stimulus, and does not consider the cause of the brainwave and the correlation of the brainwave, even if the intention recognition performance of a specific brainwave is high, the information irrelevant to the intention itself is included and classified such that there is a problem that the reliability is lowered and it is difficult to reflect the user intention as it is, that is, intuitively.

Korea Patent Registration No. 10-1633743 (title of invention: an apparatus, a system, and a method for controlling a device based on brainwave)

Korea Patent Registration No. 10-1553256 (title of invention: a method for improving the reliability of a BCI system)

SUMMARY OF INVENTION

Technical Problem

In order to solve the above-mentioned problem, the present invention is not intended to recognize intention of a user using external stimulus or motion imagination in units of characters used in the conventional brain-computer interface technology according to an embodiment of the present invention, but to generate a sentence by inferring and combining words and phrases included in a conversation sentence through a brainwave feature expressed in imagined speech for the conversation sentence itself to be spoken by a user, and output the completed conversation sentence in voice or text.

However, the technical problem to be achieved in the present embodiment is not limited to the technical problem as described above, and other technical problems may be present.

Solution to Problem

A method for recognizing a dialogue intention of a user by using brainwaves according to an embodiment of the present invention as a technical means for achieving the above technical problem, in a method for recognizing a conversation intention of a user using a brainwave performed by a brain-computer interface system that recognizes the intention of a user through the brainwave, the method includes a) selecting an example word from a database in which sounds of N (N>0) words are stored, and outputting a sound of the selected example word to a user; b) measuring a brainwave or a soundwave generated when performing imagined speech, speech act, or audible act for the example word while the sound of the example word is output, and extracting and analyzing features between brainwave data or soundwave data measured in the measuring; c) learning a decoding model of detecting a word intended by a user by using the analyzed feature; d) measuring the brainwave for a conversation sentence intended by the user through a sensor module of detecting the brainwave of the user in real time, and classifying the candidate words to be estimated as the word intended by the user in a priority from the measured brainwave based on the learned decoding model; and e) providing a result obtained by combining the classified candidate words according to the priority and generating the candidate sentence to the user in a form of voice or text, in which the decoding model includes a classification model of classifying the words intended by the user through features for the brainwave or the soundwave generated when performing the imagined speech, the speech act, or the audible act, and a soundwave provision model of deriving correlation by extracting envelope between the brainwave data and the soundwave data and then providing a soundwave waveform similar to that of the brainwave through the derived correlation.

A brain-computer interface system according to an embodiment of the present invention, in a brain-computer interface system for recognizing a conversational intention of a user through a brainwave, the system includes a sensor module that detects a brainwave of a user; a memory that stores a program for executing a method for recognizing the conversational intention of a user by using the brainwave detected in the sensor module; and a processor that executes the program, in which by execution of the program, the processor selects an example word from a database in which sounds of N (N>0) words are stored, outputs a sound of the selected example word to a user, measures a brainwave or a soundwave generated when performing imagined speech, speech act, or audible act for the example word while the sound of the example word is output, extracts and analyzes features between brainwave data or soundwave data measured, learns a decoding model of detecting a word intended by a user by using the analyzed feature, measures the brainwave for a conversation sentence intended by the user through a sensor module in real time, classifies the candidate words to be estimated as the word intended by the user in a priority from the measured brainwave based on the learned decoding model, and provides a result obtained by combining the classified candidate words according to the priority and generating the candidate sentence to the user in a form of voice or text, and the decoding model includes a classification model of classifying the words intended by the user through features for the brainwave or the soundwave generated when performing the imagined speech, the speech act, or the audible act, and a soundwave provision model of deriving correlation by extracting envelope between the brainwave data and the soundwave data and then providing a soundwave waveform similar to that of the brainwave through the derived correlation.

Advantageous Effects of Invention

According to the above-described problem solving means of the present invention, in addition to inferring the waveform of word sound intended by a user from an imagined speech brainwave associated with a word intended by a user, since the user can intuitively recognize the sentence he/she wants to speak through the imagined speech by classifying words that are most relevant to the imagined speech brainwave of the user in a database in which a word often used by the user or frequently used in a specific situation is stored and by generating a sentence intended by the user by recognizing the words classified in this way, it is possible to perform communication by only thoughts of the user. As a result, it is possible to increase convenience and variety by providing a function of expressing intentions such as conversation and memo types to various users such as the disabled and the patient as well as the general public.

At this time, the present invention can improve the accuracy for a recognition result of a conversation intention of the user by inferring the waveform of a word sound intended by a user from the imagined speech brainwave, and it is possible to improve the speed for conversation intention recognition and conversation sentence completion of the user by classifying the words intended by the user based on a database.

In addition, since the present invention uses only a brainwave expressed when imagining speech without a separate external stimulus, it is possible to obtain higher reliability and accuracy, and since the present invention can generate and output a sentence in a combination of recognized words, it is possible to recognize a conversation intention of a user at a faster speed. In addition, since the present invention can output a recognition result of the conversation intention of a user in a form of text or voice, it is possible to use it in various technologies such as various communication or device control with high degree of freedom.

DESCRIPTION OF EMBODIMENTS

Hereinafter, exemplary embodiments of the present invention will be described in detail with reference to the accompanying drawings so that those skilled in the art may easily implement the present invention. As those skilled in the art would realize, the described embodiments may be modified in various different ways, all without departing from the spirit or scope of the present invention. In the drawings, parts irrelevant to the description are omitted for simplicity of explanation, and like reference numerals designate like parts throughout the specification.

In the specification, when a part is "connected" to another part, it is not only "directly connected" but also "electrically connected" with another element therebetween. In addition, when a part is said to "include" a certain component, unless otherwise stated, it means that it may further include other components, without excluding the other components unless otherwise stated, and it should be understood that it does not exclude in advance the possibility of the presence or addition of one or more other features or numbers, steps, operations, components, parts or combinations thereof.

The following examples are detailed description to help understand on the present invention, and do not limit the scope of the present invention. Therefore, the same range of inventions that perform the same functions as the present invention will also fall within the scope of the present invention.

Hereinafter, an embodiment of the present invention will be described in detail with reference to the accompanying drawings.

Figure 1:
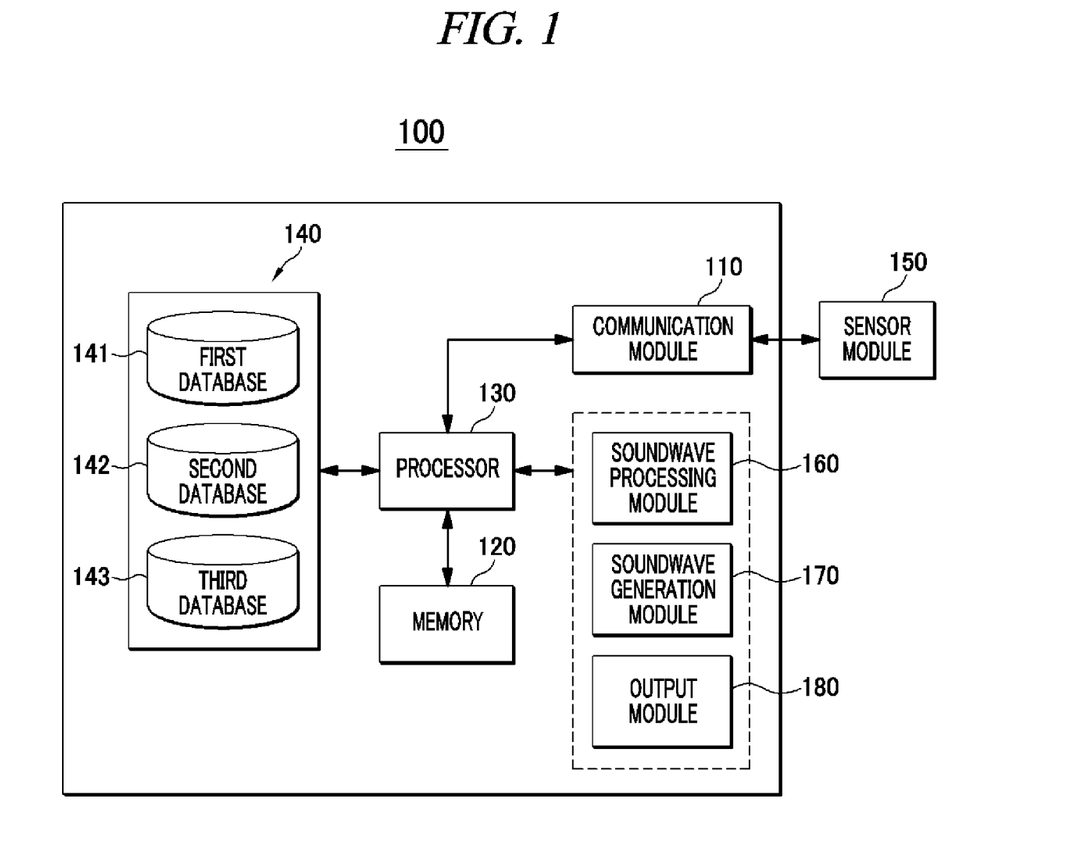
FIG. 1 is a diagram for explaining a configuration of an intuitive brain-computer interface system according to an embodiment of the present invention.

FIG. 1 is a diagram for explaining a configuration of a brain-computer interface system according to an embodiment of the present invention.

Referring to FIG. 1, a brain-computer interface system 100 includes a communication module 110, a memory 120, a processor 130, a sensor module 150, a soundwave processing module 160, a soundwave generation module 170, an output module 180, and a database 140.

The communication module 110 provides a communication interface required for providing transmission and reception signals of the brain-computer interface system 100 and an external device in a form of packet data in association with a communication network. Here, the communication module 110 may be a device including hardware and software required for transmitting and receiving a signal such as a control signal and a data signal through a wired or wireless connection with another network device.

The memory 120 stores a program for executing a method for recognizing a conversational intention of a user by using a brain-computer interface technology. In addition, the memory 120 performs a function of temporarily or permanently storing data processed by the processor 130. Here, the memory 120 may include a volatile storage medium or a non-volatile storage medium, but the scope of the present invention is not limited thereto.

The processor 130 is used to control the entire process of the method for recognizing the conversational intention of a user by using the brain-computer interface technology, measure a brainwave of imagined speech related to the conversational intention of a user, learn a decoding model by analyzing the measured brainwave data, the word soundwave data, and/or characteristics between brainwave data when speech is actually spoken, measure in real time the brainwave for recognizing a conversation sentence intended by the user by using the learned decoding model, automatically generate a candidate sentence by combining classified words after classifying words intended by the user from the measured brainwave, complete the conversation sentence by correcting and supplementing errors on the candidate sentence through user feedback, and perform communication by outputting the completed conversation sentence in a form of voice or text. Each operation performed by the processor 130 will be described in more detail below.

Here, the processor 130 may include any kind of device capable of processing data, such as a processor. Here, the "processor", for example, may mean a data processing apparatus embedded in hardware having circuitry physically structured to perform a function represented by a code or instruction included in a program. As an example of the data processing device embedded in the hardware, the data processing device may include processing devices such as a microprocessor, a central processing unit (CPU), a processor core, a multiprocessor, an application-specific integrated circuit (ASIC), a field programmable gate array (FPGA), and the like, but the scope of the present invention is not limited thereto.

The database 140 stores data accumulated while performing the method for recognizing the conversational intention of a user using the brain-computer interface technology. The database 140 may be divided into a first database 141, a second database 142, a third database 143, and the like according to the associated data, and may integrate and manage the first to third databases 141, 142, and 143.

The first database 141 collects and stores word sounds for at least one word group or more of a first word group including one or more words designated by a user, a second word group including words having a predetermined frequency of use or more, and a third word group including one or more words selected at random. The first database 141 stores soundwaves for N word sounds for brainwave learning.

The second database 142 includes a plurality of example sentences for generating the candidate sentences. At this time, the plurality of example sentences are composed of conversation sentences frequently used for each situation so that the user can configure the intended conversation. For example, depending on situation in hospitals, tourism, schools, and the like, "where are you uncomfortable?", "how do I go to OO?", "today's task is OO", and the like may be example sentences.

The processor 130 may construct the candidate sentence in which communication is possible by extracting an example sentence from the second database 142 by using candidate words classified through the decoding model, and combining the candidate words through contextual grammar and semantic analysis.

The third database 143 collects the brainwave data or the soundwave data related to the imagined speech of a user, matches words corresponding to the brainwave data or the soundwave data, and stores the matched result. The third database 143 stores waveforms of imagined speech brainwaves expressed when a user imagines speech for a specific word, and audible brainwaves when listening to the word, and waveforms of speech behavior brainwaves when the word is directly spoken.

On the other hand, the sensor module 150 detects the brainwave related to the imagined speech in a state worn by the user.

The soundwave processing module 160 detects the soundwaves generated when speech of a user is performed on an example word while the sound of the example word is output, converts the detected the soundwave into a digital signal, and stores the detected result in the memory 120.

The soundwave generation module 170 generates the soundwaves for a sound in units of words under the control of the processor 130. At this time, when the word intended by the user is not classified through the decoding model for the imagined speech brainwave, the processor 130 causes the soundwave generation module 170 to generate a sound having a waveform similar to that of the imagined speech brainwave.

The output module 180 provides the candidate sentence or conversation sentence to the user in a form of voice or text through a speaker or a display under the control of the processor 130.

Figure 2:
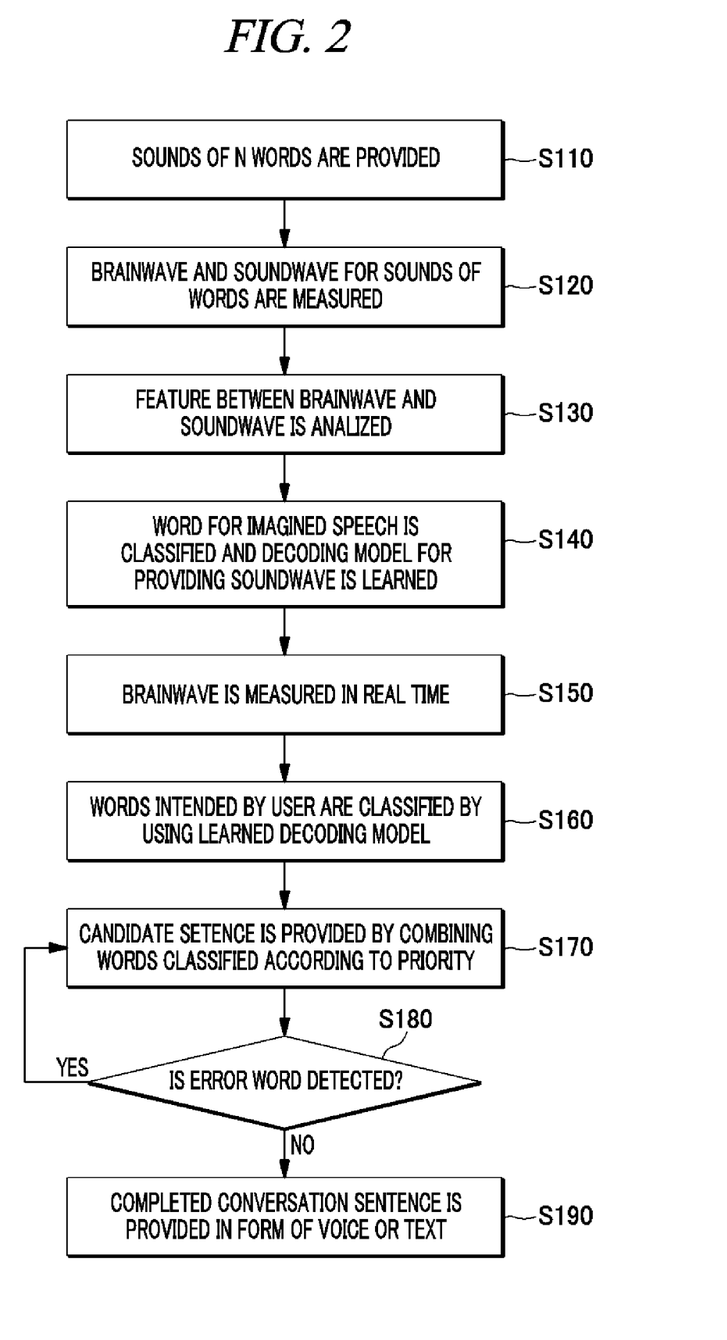
FIG. 2 is a flowchart for explaining a method for recognizing a conversational intention of a user using a brainwave according to an embodiment of the present invention.
Figure 3:
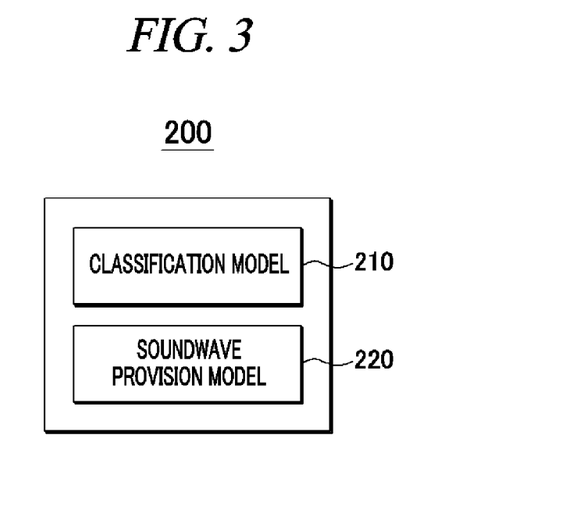
FIG. 3 is a diagram for explaining a decoding model according to an embodiment of the present invention.

FIG. 2 is a flowchart for explaining the method for recognizing the conversational intention of a user by using the brainwave according to an embodiment of the present invention, and FIG. 3 is a diagram for explaining the decoding model according to an embodiment of the present invention.

Referring to FIG. 2, the brain-computer interface system 100 selects an example word in the database 140 in which the sounds of N words are stored, and outputs the sound of the selected example word to the user (S110).

The brain-computer interface system 100 measures the imagined speech brainwave, speech act brainwave, and audible act brainwave for the example word while the sound of the example word is output, measures the soundwave generated when the user speaks directly, and then converts the measured brainwaves and soundwaves into digital signals and stored the converted result in the memory (S120). In a case of a user who is uncomfortable speaking, the brainwave of speech act is selectively measured, or in a case of a user who cannot perform speech act itself, the brainwave of speech act is not measured.

The brain-computer interface system 100 performs filtering at a frequency of 0.5 Hz to 50 Hz band through a preprocessor (not shown) for the brainwave data measured by the sensor module 150 to minimize the influence of ambient noise and power DC noise.

The brain-computer interface system 100 extracts features for common relationship between the imagined speech brainwave, the audible act brainwave, the speech act brainwave, and the soundwave data by using a signal feature extraction algorithm including Wavelet Transform, Common Spatial Pattern (CSP), Principal Component Analysis (PCA), or Independent Component Analysis (ICA) (S130).

The brain-computer interface system 100 analyzes the features between the imagined speech brainwave, the audible act brainwave, the speech act brainwave for the same word and the soundwave data, and learns the decoding model for detecting a word intended by the user by using the analyzed features (S140).

At this time, as shown in FIG. 3, a decoding model 200 includes a classification model 210 of classifying the words intended by the user through features for the brainwave or the soundwave generated when performing the imagined speech, the speech act, or the audible act, and a soundwave provision model 220 of deriving correlation by extracting envelope between the brainwave data and the soundwave data and then providing a soundwave waveform similar to that of the brainwave through the derived correlation. The brain-computer interface system 100 learns the classification model 210 by using classification methods such as Linear Discriminant Analysis (LDA), Artificial Neural Network (ANN), and Random Forest (RF).

The brain-computer interface system 100 measures the brainwave for the conversation sentence intended by a user in a real time through the sensor module 150 (S150), and classifies the candidate words estimated as the word intended by a user from the brainwave measured in real time based on the learned decoding model 200, according to a priority (S160). At this time, when a word related to the brainwave currently measured is not present in a database of the classification model 210, the learned decoding model 200 generates and provides a sound having a waveform similar to that of the imagined speech brainwave for the word intended by a user through the soundwave provision model 220, that is, the imagined speech soundwave in units of words.

The brain-computer interface system 100 combines the candidate words classified by referring the database 140 according to a priority, generates the candidate sentence, and provides the generated result to the user in a form of voice or text (S170). The brain-computer interface system may automatically generate the candidate sentence by using at least one of Natural Language Processing, grammar and vocabulary correction, Generative adversarial network (GAN), and Bayesian network.

If an error triggering potential is recognized by the user while the candidate sentence is output (S180), the brain-computer interface system 100 changes the word currently being output, that is, the error word in which the error triggering potential is occurred to the next candidate word. As described above, the brain-computer interface system 100 corrects and supplements the candidate sentence through user feedback, completes the conversation sentence intended by the user, and outputs the sentence in a form of voice or text (S190). At this time, the brain-computer interface system 100 may use technologies such as AI-based automatic correction, corpus error detection and correction, spell check, and the like, in addition to a method of correcting the candidate sentences by using the error triggering potential.

In a case of a word not classified in the classification model in the course of correcting and supplementing the conversation sentence, the brain-computer interface system 100 may provide the imagined speech soundwave for the word intended by a user through the learned soundwave provision model in units of words, and may reflect a word corresponding to the imagined speech soundwave at a suitable position in a candidate sentence through a natural language processing process based on the Bayesian probability. At this time, in a word corresponding to the imagined speech soundwave, a suitable position of the word may be determined in a candidate sentence through the natural language processing process such as soundwave feature, conversation, and semantic analysis in consideration of correlation with the candidate words classified by the learned decoding model. Therefore, the brain-computer interface system 100 outputs the entire sentence as the voice by reflecting the imagined speech soundwave, that is, the sound of the word intended by a user on the candidate sentence.

The technology of processing human language in a machine is generally called as natural language processing. Recently, it is used in various services and applications such as big data analysis, conversational interface, and machine translation. A language understanding technology, which is the basis of the natural language processing, consists of preprocessing, voice recognition, morphological analysis, syntax analysis, entity name analysis, speech act analysis, conversation analysis, and semantic information extraction.

The brain-computer interface system 100 constructs a conversation example index by using language analysis from a database 140 that stores example sentences for a large number of conversation examples, finds, from this, the example sentence most similar to the speech intention of a user, and completes the conversation sentence by properly combining the candidate words classified from the imagined speech brainwave with the example sentences. A method of completing the conversation sentence by using the example sentence has the advantage of being practical and easy to develop.

As described above, the brain-computer interface system and the method for recognizing the conversation intention of a user by using the brainwave according to an embodiment of the present invention can perform communication with only the thoughts of a user by outputting the conversation sentence completed by using the imagined speech brainwave generated when the user imagines speaking in the form of voice or text. Therefore, the present invention can be provided as a daily life assistance service for patients with disabilities and disabled people such as paralysis patients and strokes. It is possible to facilitate communication with people who have difficulty communication by providing the brain-computer interface technology that enables intuitive communication for people with disabilities or speech disorders that can make speech more difficult.

In addition, the present invention can provide convenience and variety of everyday life when providing a function for communicating with the other party with only the thoughts of the user for the general public. The present invention can be applied to various fields such as a function of controlling on an artificial intelligence device, communication through the imagined speech with a distant user, and memo of a sentence that comes to mind.

The present invention can be used in medical industry, silver industry, artificial intelligence market, smart devices, and IT companies related to an information and communication technology by being applied to a brain-computer interface-based artificial intelligence technology.

The method of recognizing user conversation intention using the brainwave according to the embodiment of the present invention described above may be implemented in a form of a recording medium including instructions executable by a computer, such as a program module executed by a computer. Such recording medium includes a computer readable medium, which can be any available media that can be accessed by the computer and includes both volatile and nonvolatile media, and removable and non-removable media. In addition, a computer-readable medium includes a computer storage medium, and the computer storage medium includes all volatile, nonvolatile, removable, and non-removable media implemented in any method or technology for the storage of information such as computer readable instructions, data structures, program modules and other data.

The description of the present invention described above is for illustration, and those skilled in the art will understand that the present invention can be easily modified in other specific forms without changing the technical spirit or essential features of the present invention. Therefore, it should be understood that the embodiments described above are exemplary in all respects and not restrictive. For example, each component described as a single type may be implemented in a distributed manner, and similarly, components described as distributed may be implemented in a combined form.

The scope of the invention is indicated by the following claims rather than the above description, and all changes or modifications derived from the meaning and scope of the claims and their equivalents should be construed as being included in the scope of the present invention.

EXPLANATION OF REFERENCE NUMERALS

100: a brain-computer interface system
110: a communication module
120: a memory
130: a processor
140: a database
150: a sensor module
160: a soundwave processing module
170: a soundwave generation module
180: an output module

The invention claimed is:

1. A method for recognizing a conversational intention of a user using a brainwave performed by a brain-computer interface system that recognizes the intention of a user through the brainwave, the method comprising:
   a) selecting an example word from a database in which sounds of N (N>0) words are stored, and outputting a sound of the selected example word to a user;

b) measuring the brainwave or a soundwave generated when performing imagined speech, speech act, or audible act for the example word while the sound of the example word is output, and extracting and analyzing features between brainwave data or soundwave data measured;

c) learning a decoding model of detecting a word intended by a user by using the analyzed feature;

d) measuring the brainwave for a conversation sentence intended by the user through a sensor module of detecting the brainwave of the user in real time, and classifying the candidate words to be estimated as the word intended by the user in a priority from the measured brainwave based on the learned decoding model; and e) providing a result obtained by combining the classified candidate words according to the priority and generating the candidate sentence to the user in a form of voice or text, wherein the decoding model includes a classification model of classifying the words intended by the user through features for the brainwave or the soundwave generated when performing the imagined speech, the speech act, or the audible act, and a soundwave provision model of deriving correlation by extracting envelope between the brainwave data and the soundwave data and then providing a soundwave waveform similar to that of the brainwave through the derived correlation.

2. The method for recognizing a conversational intention of a user according to claim 1, wherein the database includes word sounds for at least one word group or more of a first word group including one or more words designated by the user, a second word group including words having a predetermined frequency of use or more, and a third word group including one or more words selected at random.

3. The method for recognizing a conversational intention of a user according to claim 1, wherein in the b) measuring, features for common relationship between the brainwave data or the soundwave data that are measured, are extracted by using a signal feature extraction algorithm including Wavelet Transform, Common Spatial Pattern (CSP), Principal Component Analysis (PCA), or Independent Component Analysis (ICA).

4. The method for recognizing a conversational intention of a user according to claim 1, wherein in the d) measuring, when the word intended by the user is not estimated from the brainwave measured based on the learned decoding model, an imagined speech soundwave of a waveform similar to that of the measured brainwave is generated and provided in units of words.

5. The method for recognizing a conversational intention of a user according to claim 4, wherein in the e) providing, a candidate sentence is provided by combining the classified candidate words according to a priority, the imagined speech soundwave is reflected to the candidate sentence in consideration of correlation between the classified candidate words and a word corresponding to the imagined speech soundwave through a natural language processing process based on Bayesian probability, and the candidate sentence to which the imagined speech soundwave is reflected is output as voice.

6. The method for recognizing a conversational intention of a user according to claim 1, wherein in the e) providing, the candidate sentence is automatically generated by using one of Natural Language Processing, Grammar and vocabulary correction, Generative adversarial network, and Bayesian network.

7. The method for recognizing a conversational intention of a user according to claim 1, wherein in the e) providing, the conversation sentence is completed by correcting the candidate sentence through user feedback for the candidate sentence, and then the completed conversation sentence is output in a form of voice or text.

8. The method for recognizing a conversational intention of a user according to claim 7, wherein in the e) providing, when Error related Potential from the user is recognized while the candidate sentence is output, the conversation sentence is completed by correcting an error word corresponding to a portion where the Error related Potential is recognized as the candidate word of a next order.

9. The method for recognizing a conversational intention of a user according to claim 8, wherein in the e) providing, the candidate sentence is completed by selecting the candidate sentence in consideration of relationship with words before and after the error word in a natural language processing process based on Bayesian probability and correcting the error word with the selected candidate word.

10. A brain-computer interface system for recognizing a conversational intention of a user through a brainwave comprising:

a sensor module that detects a brainwave of a user;

a memory that stores a program for executing a method for recognizing the conversational intention of a user by using the brainwave detected in the sensor module; and a processor that executes the program, wherein by executing the program, the processor selects an example word from a database in which sounds of N (N>0) words are stored, outputs a sound of the selected example word to a user, measures a brainwave or a soundwave generated when performing imagined speech, speech act, or audible act for the example word while the sound of the example word is output, extracts and analyzes features between brainwave data or soundwave data measured, learns a decoding model of detecting a word intended by a user by using the analyzed feature, measures the brainwave for a conversation sentence intended by the user through the sensor module in real time, classifies the candidate words to be estimated as the word intended by the user in a priority from the measured brainwave based on the learned decoding model, and provides a result obtained by combining the classified candidate words according to the priority and generating the candidate sentence to the user in a form of voice or text, and wherein the decoding model includes a classification model of classifying the words intended by the user through features for the brainwave or the soundwave generated when performing the imagined speech, the speech act, or the audible act, and a soundwave provision model of deriving correlation by extracting envelope between the brainwave data and the soundwave data and then providing a soundwave waveform similar to that of the brainwave through the derived correlation.

11. The brain-computer interface system according to claim 10, further comprising:
- a soundwave processing module that detects the soundwaves generated when speech of a user is performed on the example word while sound of the example word is output, converts the detected the soundwave into a digital signal, and stores the detected soundwave in the memory;
- a soundwave generation module that generates the soundwaves for the sound in units of words under the control of the processor; and
- an output module that provides the candidate sentence or the conversation sentence to the user in the form of voice or text under the control of the processor.

12. The brain-computer interface system according to claim 10,
wherein the processor eliminates noise in the brainwave data or the soundwave data measured through a preprocessor and extracts a signal of a predetermined frequency band.

13. The brain-computer interface system according to claim 10,
wherein the database includes
- a first database that includes a word sound for at least one word group or more of a first word group including one or more words designated by a user, a second word group including words having a predetermined frequency or more, and a third word group including one or more words selected at random,
- a second database that includes a plurality of example sentences for generating the candidate sentence, and
- a third database that collects the brainwave data or the soundwave data related to the imagined speech of the user, matches words corresponding to the brainwave data or the soundwave data, and stores the matched result.

14. The brain-computer interface system according to claim 13,
wherein the processor extracts an example sentence from the second database by using the classified candidate words and generates the candidate sentence by combining the candidate word with the example sentence extracted by using at least one of Natural Language Processing, grammar and vocabulary correction, Generative adversarial network, and Bayesian network according to a priority.

15. The brain-computer interface system according to claim 10,
wherein when the word intended by the user is not estimated from the brainwave measured based on the learned decoding model, the processor generates and provides an imagined speech soundwave of a waveform similar to that of the measured brainwave in units of words.

16. The brain-computer interface system according to claim 10,
wherein the processor completes the conversation sentence by correcting the candidate sentence through user feedback for the candidate sentence, outputs the completed conversation sentence in a form of voice or text, and completes the conversation sentence by correcting an error word corresponding to a portion where Error related Potential is recognized, with the candidate word of a next order when the Error related Potential is recognized from the user while the candidate sentence is output.

* * * * *